(12) United States Patent
Herr et al.

(10) Patent No.: US 9,752,559 B2
(45) Date of Patent: Sep. 5, 2017

(54) ROTATABLE AERODYNAMIC SURFACE FEATURES FOR WIND TURBINE ROTOR BLADES

(71) Applicant: General Electric Company, Schenectady, NY (US)

(72) Inventors: Stefan Herr, Greenville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 749 days.

(21) Appl. No.: 14/157,598

(22) Filed: Jan. 17, 2014

(65) Prior Publication Data

US 2015/0204306 A1    Jul. 23, 2015

(51) Int. Cl.
*B64C 23/06*     (2006.01)
*B64C 3/58*     (2006.01)
(Continued)

(52) U.S. Cl.
CPC ............... *F03D 7/022* (2013.01); *B64C 3/58* (2013.01); *B64C 23/06* (2013.01); *F03D 1/0633* (2013.01);
(Continued)

(58) Field of Classification Search
CPC ................. Y02E 10/721; Y02E 10/723; F05B 2240/122; F05B 2240/31; F05B 2240/30;
(Continued)

(56) References Cited

U.S. PATENT DOCUMENTS 2,740,596 A   *   4/1956   Lee ..................... B64C 23/06
                                                  244/130
4,039,161 A       8/1977   Bauer
(Continued)

FOREIGN PATENT DOCUMENTS

EP        0947693      10/1999
EP        1674723      6/2006
(Continued)

OTHER PUBLICATIONS van Dam, C.P.; "Airfoils for Structures-Passive and Active Load Control for Wind Turbine Blades", Department of Mechanical and Aeronautical Engineering, University of California-Davis.
(Continued)

*Primary Examiner* — Mark Laurenzi
*Assistant Examiner* — Wesley Harris
(74) *Attorney, Agent, or Firm* — Dority & Manning, P.A.

(57) ABSTRACT

The present subject matter directed to a rotor blade assembly for a wind turbine having at least one rotatable aerodynamic surface feature configured thereon. The rotor blade assembly includes a body shell including a pressure side surface and a suction side surface extending between a leading edge and a trailing edge. The aerodynamic surface feature is disposed adjacent to the pressure side surface, the suction side surface, and/or both. In addition, the surface feature may have a generally airfoil-shaped cross section. As such, an actuator can be configured at least partially within an internal volume of the surface feature, the actuator being configured to rotate the surface feature relative to the body shell.

18 Claims, 6 Drawing Sheets

(51) Int. Cl.
*F03D 1/06* (2006.01)
*F03D 7/02* (2006.01)
*F03D 80/00* (2016.01)

(52) U.S. Cl.
CPC ......... *F03D 1/0641* (2013.01); *F03D 1/0675* (2013.01); *F03D 7/024* (2013.01); *F03D 7/0224* (2013.01); *F03D 7/0232* (2013.01); *F03D 7/0252* (2013.01); *F03D 80/00* (2016.05); *F05B 2240/122* (2013.01); *F05B 2240/30* (2013.01); *F05B 2240/31* (2013.01); *F05B 2240/313* (2013.01); *F05B 2260/502* (2013.01); *Y02E 10/721* (2013.01); *Y02E 10/723* (2013.01); *Y02T 50/162* (2013.01)

(58) Field of Classification Search
CPC ......... F05B 2260/502; F05B 2240/313; B64C 23/06; B64C 3/58; F03D 1/0633; F03D 1/0641; F03D 7/0252; F03D 80/00; F03D 7/022; F03D 7/0224; F03D 7/0232; F03D 7/024; Y02T 50/162
USPC ...................................... 416/23–24
See application file for complete search history.

(56) References Cited

U.S. PATENT DOCUMENTS

| | | | |
|---|---|---|---|
| 4,082,479 A | 4/1978 | Rangi et al. | |
| 4,354,648 A | 10/1982 | Schenk et al. | |
| 4,500,257 A | 2/1985 | Sullivan | |
| 4,692,095 A | 9/1987 | Lawson-Tancred | |
| 4,715,782 A | 12/1987 | Shimmel | |
| 5,106,265 A | 4/1992 | Holzem | |
| 5,253,828 A | 10/1993 | Cox | |
| 5,570,859 A | 11/1996 | Quandt | |
| 6,105,904 A | 8/2000 | Lisy et al. | |
| 6,427,948 B1 | 8/2002 | Campbell | |
| 6,837,465 B2 | 1/2005 | Lisy et al. | |
| 7,293,959 B2 | 11/2007 | Pedersen et al. | |
| 7,585,157 B2 | 9/2009 | Quell et al. | |
| 7,604,461 B2 | 10/2009 | Bonnet | |
| 7,914,259 B2 | 3/2011 | Godsk | |
| 8,038,396 B2 | 10/2011 | Anjuri et al. | |
| 8,047,801 B2 | 11/2011 | Fang et al. | |
| 2006/0140760 A1 | 6/2006 | Saddoughi et al. | |
| 2007/0231151 A1 | 10/2007 | Herr et al. | |
| 2008/0175711 A1 | 7/2008 | Godsk | |
| 2009/0068018 A1* | 3/2009 | Corten | F03D 1/0641 416/223 R |
| 2009/0280009 A1 | 11/2009 | Brock | |
| 2009/0284016 A1 | 11/2009 | Van Dam et al. | |
| 2009/0285682 A1 | 11/2009 | Baker et al. | |
| 2010/0104436 A1 | 4/2010 | Herr et al. | |
| 2011/0142664 A1 | 6/2011 | Anjuri et al. | |
| 2013/0037657 A1 | 2/2013 | Breidenthal | |

FOREIGN PATENT DOCUMENTS

| | | | |
|---|---|---|---|
| EP | 1772623 | 4/2007 | |
| EP | 1896323 | 3/2008 | |
| EP | 1944505 | 7/2008 | |
| EP | 2098721 | 9/2009 | |
| JP | 4029063 | 1/1992 | |
| WO | WO 00/15961 | 3/2000 | |
| WO | WO 01/16482 | 3/2001 | |
| WO | WO 2007/005687 | 1/2007 | |
| WO | WO 2007/065434 | 6/2007 | |
| WO | WO 2007/140771 | 12/2007 | |
| WO | WO 2008/113349 | 9/2008 | |
| WO | WO 2008/113350 | 9/2008 | |
| WO | WO 2015053768 A1 * | 4/2015 | ........... F03D 7/0224 |

OTHER PUBLICATIONS

Vronsky, T.; "High Performance Cost-Effective Large Wind Turbine Blades Using Air-Jet Vortex Generators", ETSU W/41/00541/REP, 2000.

* cited by examiner

ROTATABLE AERODYNAMIC SURFACE FEATURES FOR WIND TURBINE ROTOR BLADES

FIELD OF THE INVENTION

The present subject matter relates generally to wind turbines and, more particularly, to rotatable aerodynamic surface features for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The particular size of wind turbine rotor blades is a significant factor contributing to the overall efficiency of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative energy source. However, as rotor blade sizes increase, so do the loads transferred through the blades to other components of the wind turbine (e.g., the wind turbine hub and other components). For example, longer rotor blades result in higher loads due to the increased mass of the blades as well as the increased aerodynamic loads acting along the span of the blade. Such increased loads can be particularly problematic in high-speed wind conditions, as the loads transferred through the rotor blades may exceed the load-bearing capabilities of other wind turbine components.

Certain surface features, e.g. spoilers, may be utilized to separate the flow of air from the outer surface of a rotor blade, thereby reducing the lift generated by the blade and reducing the loads acting on the blade. Other surface features, e.g. vortex generators, may delay separation of the air flowing over a rotor blade to increase loads during periods of decreased wind. In many instances, both of these surface features are designed to be permanently disposed along the outer surface of the rotor blade. As such, the amount of lift generated by the rotor blade is reduced or increased regardless of the conditions in which the wind turbine is operating and does not allow for any dynamic control.

Alternatively, it is known in the art to provide one or more actuators within the rotor blade shell to move the surface features between the spoiler and vortex generator positions and/or between actuated and recessed positions within the blade shell. Such actuators, however, are installed within the rotor blade shell, thereby increasing maintenance and/or installation time and costs. In addition, such actuators can damage the rotor blade shell.

Accordingly, a rotor blade assembly having improved surface features that addresses the aforementioned issues would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly includes a body shell having pressure and suction side surfaces extending between leading and trailing edges, at least one aerodynamic surface feature, and an actuator. The surface feature is disposed adjacent to at least one of the pressure or suction side surfaces of the body shell. In addition, the surface feature defines an internal volume. The actuator is configured within the internal volume and is configured to rotate the surface feature relative to the body shell.

In another embodiment, the surface feature includes a fixed portion and a rotatable portion. The fixed portion may be fixed relative to the body shell, whereas the rotatable portion may be configured to rotate relative to the fixed portion. In addition, the fixed portion includes a bottom surface and a top surface. The bottom surface may be configured for attachment to at least one of the pressure side surface or the suction side surface. More specifically, the bottom surface may correspond to a contour of at least one of the pressure side surface or the suction side surface of the rotor blade. The top surface of the fixed portion may be configured with the rotatable portion. In another embodiment, when in a rotated configuration, the surface feature may define a gap between the rotatable portion and the body shell.

In further embodiments, the actuator may be configured atop the bottom surface of the fixed portion within the internal volume. As such, the actuator may be configured partially within the fixed portion and partially within the rotatable portion. Alternatively, the actuator may be configured entirely within the fixed portion or entirely within the rotatable portion.

In still further embodiments, the surface feature may include an airfoil-shaped cross-section or similar. As such, the cross-section may include varying thicknesses along a length of the surface feature. In addition, the actuator may be configured at a maximum thickness of the cross-section. In still further embodiments, each of the surface features may define a height between a tip end of each of the surface features and an outer surface of the body shell when the surface feature is installed onto either the pressure or suction side surfaces of the rotor blade assembly. More specifically, the height may be any suitable height ranging from about 10 millimeters to about 100 millimeters. In still further embodiments, the height may be less than 10 millimeters or greater than 100 millimeters.

In another embodiment, the rotor blade assembly may include a plurality of aerodynamic surface features. Each of the surface features may include an actuator configured at least partially within the internal volume of each surface feature. In further embodiments, a first set of the plurality of surface features may be more proximate a blade root than a second set of the plurality of surface features, and the second set of the plurality of surface features may be more proximate to a blade tip than the first set of the plurality of surface features. In still further embodiments, the surface feature(s) may be configured to rotate between any of the following positions: a vortex generator position, a spoiler position, a gurney flap position, a stall breaker position, or similar.

In another aspect, an aerodynamic surface feature for a rotor blade of a wind turbine is disclosed. The surface feature includes a body defining a profile of the surface feature. The body includes a fixed portion and a rotatable portion. The fixed portion includes a bottom surface, a top surface, and an internal volume. The bottom surface corresponds to a contour of at least one of the pressure side surface or the suction side surface of the rotor blade assembly. As such, the bottom surface is configured for attachment to at least one of a pressure side surface or a suction side surface of the rotor blade assembly. The internal volume is configured to at least partially house an actuator therein. The rotatable portion is configured with the top surface of the fixed portion. As such, the rotatable portion is configured to rotate relative to the fixed portion when the surface feature is attached to a surface of the rotor blade.

In yet another aspect, the present subject matter is directed to a rotor blade assembly for a wind turbine. The rotor blade assembly includes a body shell having a pressure side surface and a suction side surface extending between a leading edge and a trailing edge and at least one aerodynamic surface feature disposed adjacent to at least one of the pressure side surface or the suction side surface. The surface feature defines an internal volume and an airfoil-shaped cross-section. At least a portion of the surface feature is configured to rotate relative to the body shell.

In further embodiments, the rotor blade assembly includes an actuator disposed at least partially within the internal volume. The actuator is configured to rotate the surface feature relative to the body shell. It should also be understood that the aerodynamic surface feature may include any one of or a combination of the features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a rotatable aerodynamic surface feature for a wind turbine rotor blade. More specifically, the surface feature may have a generally airfoil-shaped cross section that provides an internal volume configured to house at least a portion of an actuator therein. For example, in one embodiment, the internal volume can accommodate the entire actuator. As such, the aerodynamic surface feature and corresponding actuator can be added to the surface of a rotor blade without disturbing the aerodynamic function of the blade (i.e. by penetrating the blade shell). In a further embodiment, the aerodynamic surface feature may be split into a fixed portion and a rotatable portion to allow for rotating on a curved blade surface.

Figure 1:
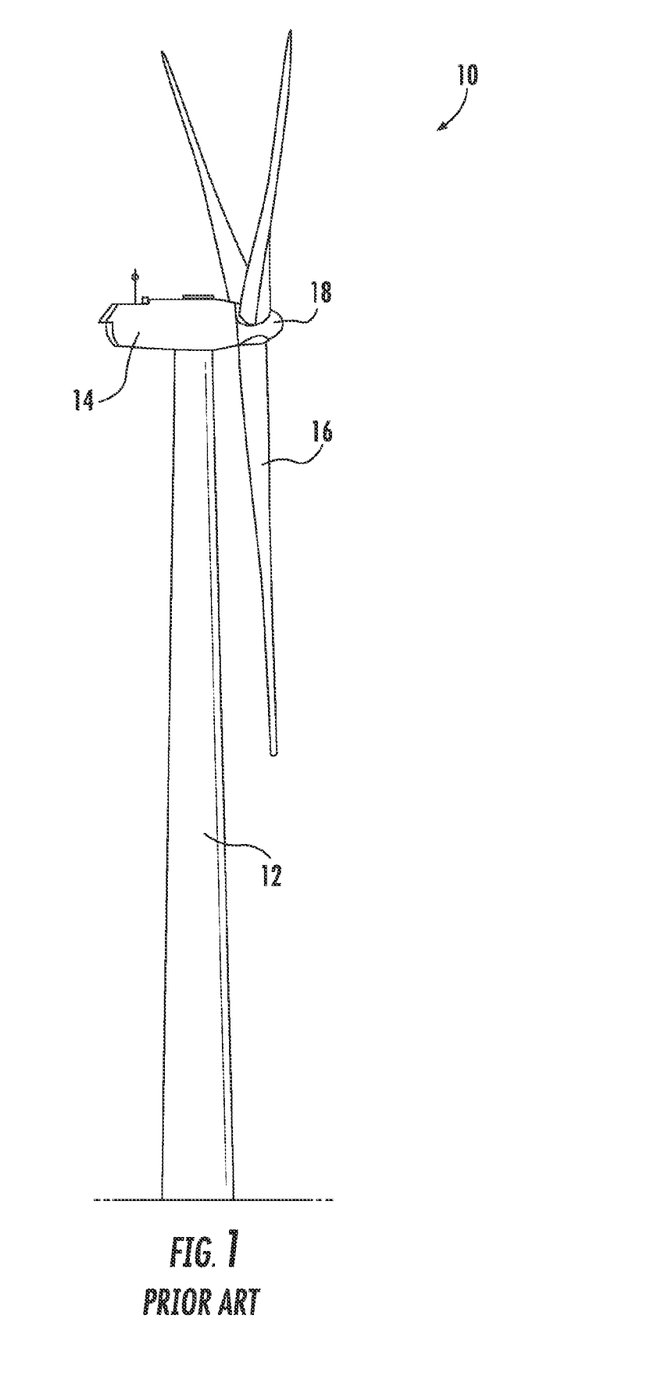
FIG. 1 illustrates a perspective view of a wind turbine of conventional construction.

Referring now to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the view of FIG. 1 is provided for illustrative purposes only to place the present subject matter in an exemplary field of use. Thus, one of ordinary skill in the art should readily appreciate that the present subject matter need not be limited to any particular type of wind turbine configuration.

Figure 2:
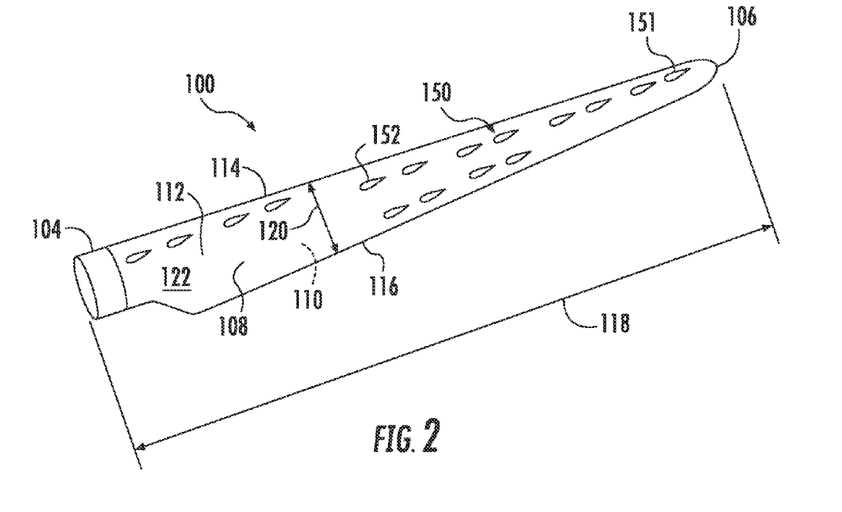
FIG. 2 illustrates a perspective view of one embodiment of a rotor blade assembly having aerodynamic surface features in accordance with aspects of the present subject matter.
Figure 3:
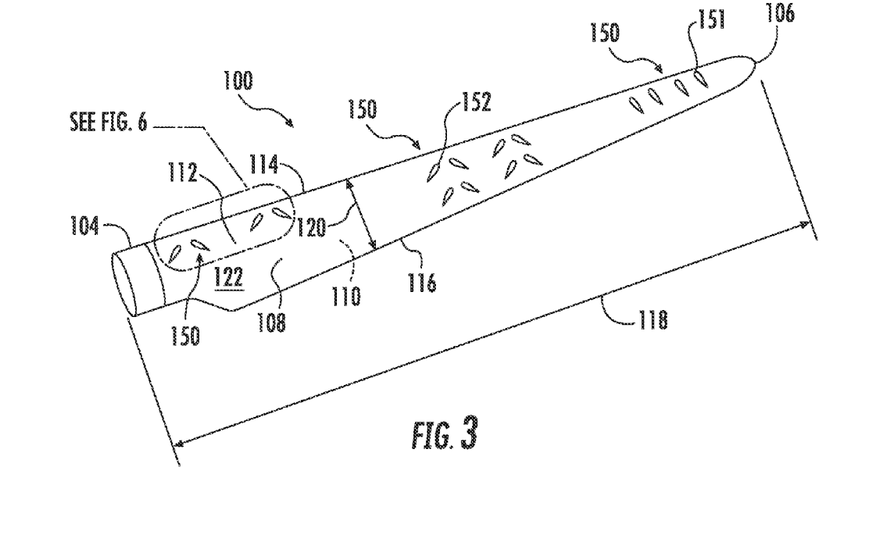
FIG. 3 illustrates a perspective view of another embodiment of a rotor blade assembly having aerodynamic surface features in accordance with aspects of the present subject matter.
Figure 4:
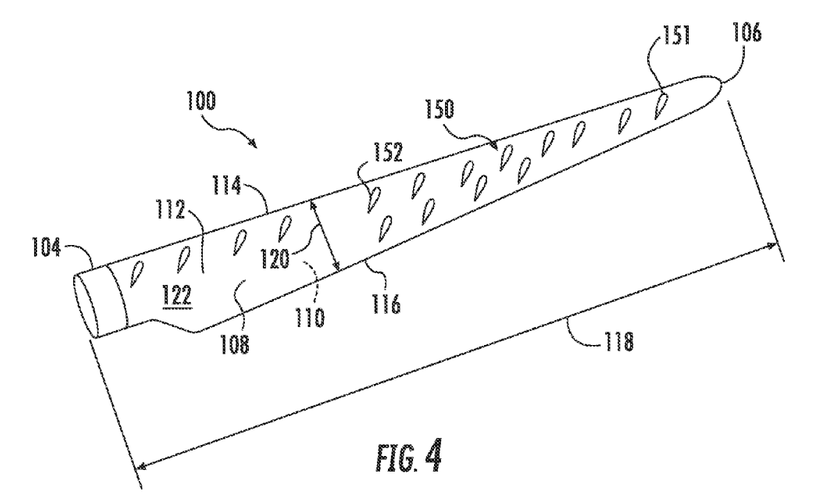
FIG. 4 illustrates a perspective view of another embodiment of a rotor blade assembly having aerodynamic surface features in accordance with aspects of the present subject matter.
Figure 5:
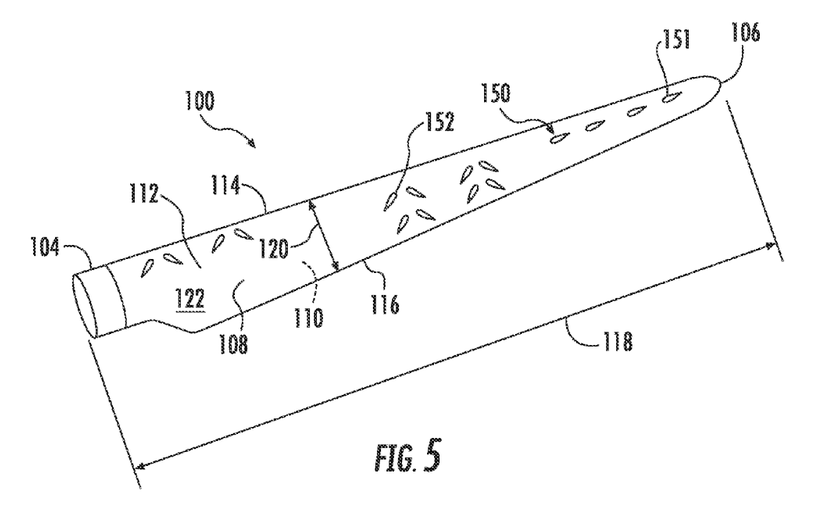
FIG. 5 illustrates a perspective view of another embodiment of a rotor blade assembly having aerodynamic surface features in accordance with aspects of the present subject matter.
Figure 6:
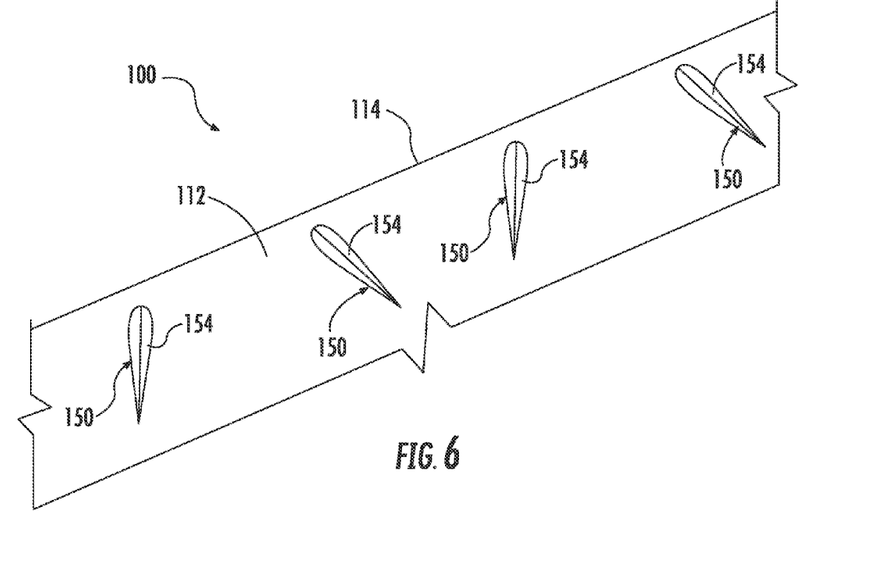
FIG. 6 illustrates a detailed, partial perspective view of the embodiment of FIG. 3 as indicated by the dotted lines.
Figure 7:
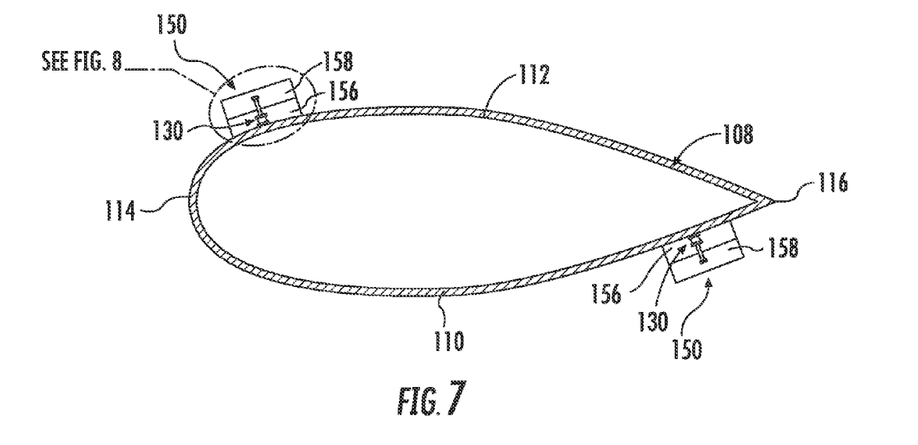
FIG. 7 illustrates a cross-sectional view of a rotor blade assembly having aerodynamic surface features in accordance with aspects of the present subject matter.

Referring now to FIGS. 2-6, a rotor blade assembly 100 having a plurality of rotatable, aerodynamic surface features 150 in accordance with aspects of the present subject matter is illustrated. In particular, FIG. 2 illustrates a perspective view of the rotor blade assembly 100 having a plurality of aerodynamic surface features 150 in spoiler positions. FIG. 3 illustrates a perspective view of the rotor blade assembly 100 having a plurality of aerodynamic surface features 150 in various vortex generator positions. FIG. 4 illustrates a perspective view of the rotor blade assembly 100 having a plurality of aerodynamic surface features 150 in intermediate positions. FIG. 5 illustrates a perspective view of the rotor blade assembly 100 having a plurality of aerodynamic surface features 150 in both spoiler positions and vortex generator positions. FIG. 6 illustrates a detailed, partial perspective view of the rotor blade assembly 100 of FIG. 3 having aerodynamic surface features 150 as indicated by the dotted line.

In general, the rotor blade assembly 100 includes a blade root 104 configured for mounting the rotor blade assembly 100 to the hub 18 of the wind turbine 10 (FIG. 1) and a blade tip 106 disposed opposite the blade root 104. A body shell 108 of the rotor blade assembly 100 may generally be configured to extend between the blade root 104 and the blade tip 106 and may serve as the outer casing/covering having an outer surface 122 of the rotor blade assembly 100. In several embodiments, the body shell 108 may define a substantially aerodynamic profile, such as by defining a symmetrical or cambered airfoil-shaped cross-section. As such, the body shell 108 may define a pressure side surface 110 and a suction side surface 112 extending between a leading edge 114 and a trailing edge 116. Further, the rotor blade assembly 100 may have a span 118 defining the total length between the blade root 104 and the blade tip 106 and a chord 120 defining the total length between the leading edge 114 and the trailing edge 116. As is generally understood, the chord 120 may vary in length with respect to the span 118 as the rotor blade assembly 100 extends from the blade root 104 to the blade tip 106.

In several embodiments, the body shell 108 of the rotor blade assembly 100 may be formed as a single, unitary component. Alternatively, the body shell 108 may be formed from a plurality of shell components. For example, the body shell 108 may be manufactured from a first shell half generally defining the pressure side surface 110 of the rotor blade assembly 100 and a second shell half generally defining the suction side surface 112 of the rotor blade assembly 100, with the shell halves being secured to one another at the leading and trailing edges 114, 116 of the blade assembly 100. Additionally, the body shell 108 may generally be formed from any suitable material. For instance, in one embodiment, the body shell 108 may be formed entirely from a laminate composite material, such as a carbon fiber reinforced laminate composite or a glass fiber reinforced laminate composite. Alternatively, one or more portions of the body shell 108 may be configured as a layered construction and may include a core material, formed from a lightweight material such as wood (e.g., balsa), foam (e.g., extruded polystyrene foam), or a combination of such materials disposed between layers of laminate composite material.

As mentioned and still referring to FIGS. 2-6, the rotor blade assembly 100 includes at least one rotatable, aerodynamic surface feature 150. As used herein, "rotatable" refers to the entire surface feature 150 being rotatable, or one or more portions of the surface feature being rotatable. For instance, in some embodiments, the surface feature 150 may comprise a central pin around which the rest of the surface feature rotates between various positions. For example, in some embodiments, the aerodynamic surface features 150 may be in a spoiler position (as best illustrated in FIG. 2) and/or a vortex generator position (as best illustrated in FIG. 3), or any combination thereof. In still further embodiments, the surface features 150 may be rotated to any other suitable positions, including a gurney flap position or a stall breaker position.

As used herein, the "spoiler position" refers to a position of the plurality of surface features 150 that separates air flowing over the rotor blade assembly 100 from the outer surface 122 of the body shell 108, thereby reducing the lift generated by the blade 100 and decreasing the loads transferred through the blade 100 to other components of the wind turbine 10 (e.g. the rotor hub 18 of the wind turbine 10 illustrated in FIG. 1). For example, as best illustrated in FIG. 2, the plurality of surface features 150 may be substantially parallel with the span 118 of the rotor blade assembly 100 when in the spoiler position. The spoiler position may thereby be utilized during increased loading on the rotor blade assembly 100 (e.g., during operation in high-speed wind conditions). In some embodiments, the space between the surface features 150 in spoiler positions may be selected to ensure adequate spacing when the surface features 150 are rotated to vortex generator positions as should be appreciated herein. The spacing may depend on, for example, the size of the surface features 150, the position on the rotor blade assembly 100 with respect to the span and/or the chord, or any other relevant factors. For example, in various embodiments, the space between two of surface features 150 may be less than, greater than or equal to the length of a surface feature 150.

As also used herein, the "vortex generator position" refers to a position of the plurality of surface features 150 that delays flow separation of air flowing over the rotor blade assembly 100 from the outer surface 122 of the body shell 108. While in the vortex generator position, the surface features 150 may include a plurality of vanes, bumps, ridges and/or other configurations to create a vortex in the air flowing along the outer surface 122 of the body shell 108. Vortices created by the plurality of surface features 150 in the vortex generator position can increase the downstream momentum of the airflow, thereby encouraging the air to remain attached to the outer surface 122. The vortex generator position may therefore be utilized to increase loading on the rotor blade assembly 100. In addition, the vortex generator position may help to increase the rotor blade assembly's power extraction from the wind.

For example, as best illustrated in FIG. 3, the aerodynamic surface features 150 may be substantially parallel with the direction of the chord 120 (such as illustrated with a first surface feature 151 proximate the blade tip 106) or angled between the directions of the span 118 and the chord 120 (such as illustrated with a second surface feature 152 more proximate the blade root 104). In further embodiments, each of surface features 150 in the vortex generator position may be facing the same direction, or may alternatively be facing opposite directions such that they form a plurality of V-like structures (as illustrated in FIG. 3). In still further embodiments, the surface features 150 may be in different vortex generator positions (e.g., a first and a second vortex generator position) such that the angle of each vortex generator position can be customized based on at least the position along the rotor blade assembly 100.

As used herein, the "gurney flap position" generally refers to a position of the surface features 150 projecting from a trailing edge of the rotor blade assembly 100. Typically, a gurney flap is set at a right angle to the pressure side surface 110 of the rotor blade and projects 1 to 2% of the chord 120. More specifically, the gurney flap position is capable of generating a small zone of separated airflow upstream and downstream of the gurney flap, thereby increasing the airflow's circulation. As such, the gurney flap position is configured to improve the performance of the rotor blade assembly 100 by increasing pressure on the pressure side surface 110 and decreasing pressure on the suction side surface 112.

As used herein, the "stall breaker position" generally refers to a position of the surface features 150 that prevents stall of the rotor blade assembly 100 (i.e. prevents increases in air resistance and decreases in lift). Typically, stall occurs when the rotor blade assembly 100 is under too great of an angle of attack, thereby causing the rotor blade assembly 100 to produce less lift and more drag. A stall breaker position can be any position configured for eliminating and/or reducing the stall experienced by the rotor blade assembly 100.

Referring specifically to FIG. 4, the aerodynamic surface features 150 may also be in intermediate positions. As used herein, "intermediate positions" refer to positions between any of the positions described herein, e.g. between the spoiler position and the vortex generator position. Moving one or more of the surface features 150 into intermediate positions may allow for greater customization of air flow redirection as it passes over the outer surface 122 of the body shell 108. More specifically, the load on the rotor blade assembly 100 may be adjusted by moving the surface features 150 to any intermediate position between the spoiler position (which can decrease the load) and the vortex generator position (which can increase the load).

In addition and referring particularly to FIG. 5, the aerodynamic surface features 150 may also be rotatable between the various positions described herein independent of one another. For example, as shown in the illustrated embodiment, the surface features 150 near the blade root 104 are in the vortex generator position, whereas the surface features 150 near the blade tip 106 are in the spoiler position. The independent movement of the plurality of surface features 150 can allow for the manipulation of wind on the rotor blade assembly 100 specific to the location along direction of the span 118 and/or the chord 120.

Figure 8:
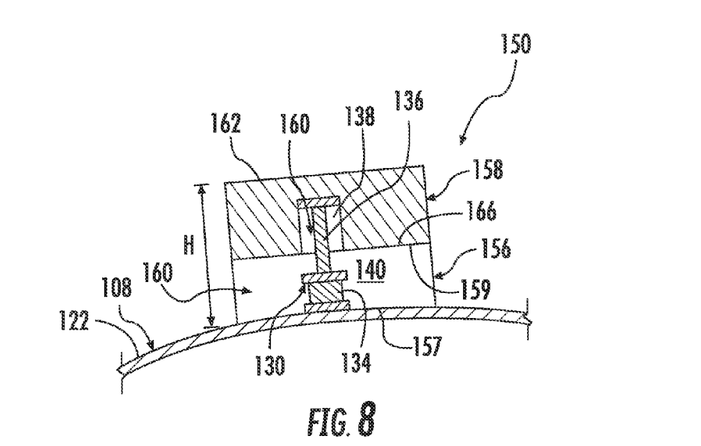
FIG. 8 illustrates a detailed, partial cross-sectional view of the rotor blade assembly of FIG. 7.

Referring to FIGS. 7-10, the aerodynamic surface features 150 may include a fixed portion 156 and a rotatable portion 158. Further, each of the surface features 150 may define an internal volume 160. For example, as shown in FIG. 8, the internal volume 160 of the surface features 150 may include cavity 140 of the fixed portion 156 and cavity 138 of the rotatable portion 158. Alternatively, the internal volume may be defined entirely in the fixed portion 156 or entirely in the rotatable portion 158.

In general, the fixed portion 156 may be fixed relative to the body shell 108 of the rotor blade assembly 100. More specifically, as shown in the illustrated embodiments, the fixed portion 156 may include a bottom surface 157 and a top surface 159. In some embodiments, the bottom surface 157 may correspond to a contour of at least one of the pressure side surface 110 or the suction side surface 112 of the rotor blade assembly 100. As such, the bottom surface 157 is configured for attachment to either of the pressure or suction surfaces 110, 112.

Figure 11:
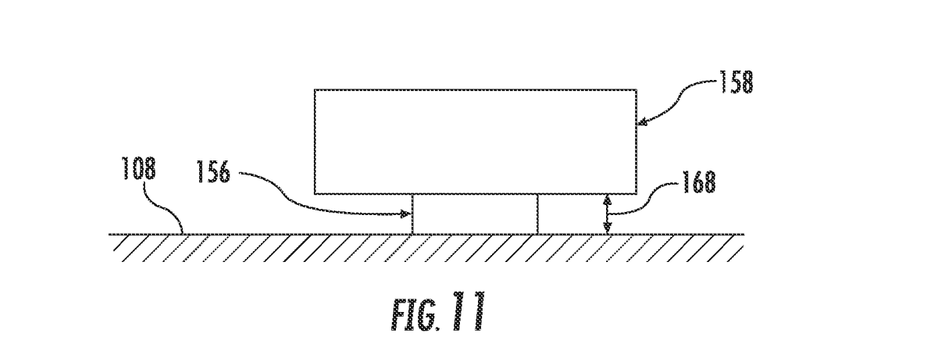

In addition, the rotatable portion 158 may have a bottom surface 166 configured to attach to the top surface 159 of the fixed portion 156. Further, the rotatable portion 158 and the fixed portion 156 may be connected together by a pin or an actuator (as discussed later) such that the rotatable portion 158 may be configured to rotate relative to the fixed portion 156. For example, in one embodiment, the tolerances between the top surface 159 of the fixed portion 156 and the bottom surface 166 of the rotatable portion 158 may be designed such that rotation is allowed between the surfaces 159, 166. In a non-rotated configuration, as shown particularly in FIG. 9, the fixed portion 156 and the rotatable portion 158 may abut against one another to form a uniform cross-section between the portions 156, 158. In a rotated configuration, as shown particularly in FIGS. 10 and 11, the rotatable portion 158 is rotated relative to the fixed portion 156 so as to form a non-uniform cross-section between the portions 156, 158. As shown, the rotated configuration may also provide a gap 168 between the body shell 108 and the rotatable portion 158. In one embodiment, the gap 168 is typically the finite height of the fixed portion 156. The gap 168 may be beneficial because it allows for easy rotation of the rotatable portion 158 on the typically curved body shell 108. In other words, by providing the fixed portion have a substantially flat top surface 159, the rotatable portion 158 can easily rotate relative to the curved body shell 108 to the various positions described herein. It should be understood that the gap 168 may be any suitable distance greater than zero.

It should be understood that the aerodynamic surface features 150 may have a variety of shapes. In particular and referring to FIGS. 6 and 9-10, various views of suitable cross-sectional shapes 154 of the surface features 150 are illustrated. For example, as shown, each of the surface features has an airfoil-shaped cross-section 154. As used herein, the term "airfoil" is meant to encompass the shape of a wing, blade, or sail as viewed in cross-section. Further, an airfoil typically produces an aerodynamic force (e.g. lift and/or drag) when moved through a fluid. As such, the airfoil-shaped surface features 150 are capable of controlling the aerodynamic behavior of the rotor blade assembly 100.

Figure 9:
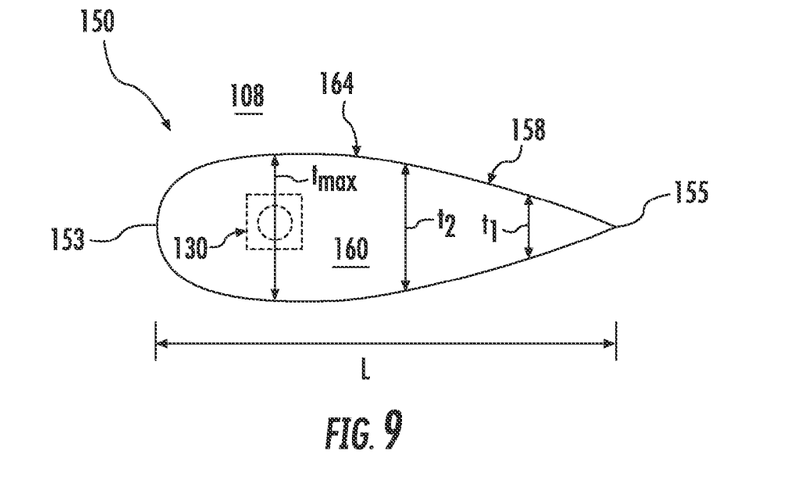
FIG. 9 illustrates a top view of one embodiment of an aerodynamic surface feature in an un-rotated position in accordance with aspects of the present subject matter.
Figure 10:
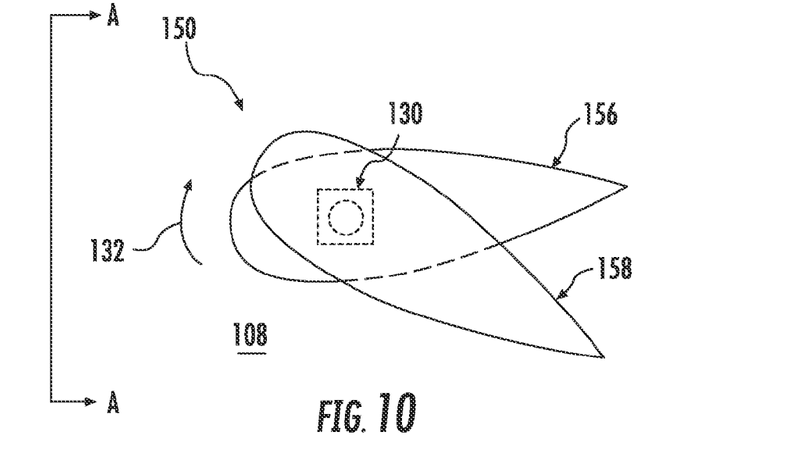
FIG. 10 illustrates a top view of another embodiment of an aerodynamic surface feature in a rotated position in accordance with aspects of the present subject matter; and, FIG. 11 illustrates a side view of the embodiment of FIG. 10.

Referring to FIG. 9, the airfoil-shaped surface features 150 may have varying thicknesses along a length L of the surface feature 150 as represented by $t_1$, $t_2$, and $t_{MAX}$. For example, the thickness of the cross-section of the surface feature 150 is greatest near a leading edge 153 of the surface feature 150 and narrows until it reaches a trailing edge 155 of the surface feature 150. Such a configuration provides an aerodynamic surface feature 150 that is capable of accommodating various features and/or components within the internal volume 160 of the surface features 150, especially at its maximum thickness $t_{MAX}$.

For example, and referring particularly to FIGS. 7-10, each of the aerodynamic surface features 150 may include an actuator 130 disposed at least partially within the internal volume 160 of the surface features 150. For example, in one embodiment, the actuator 130 may be configured entirely within the internal volume 160 of the surface feature 150. More specifically, as shown, the actuator 130 may be disposed atop the bottom surface 159 of the fixed portion 156 of the surface feature 150. As such, the actuator 130 may be configured partially within the fixed portion 156 and partially within the rotatable portion 158 within the internal volume 160. Alternatively, the actuator 130 may be configured entirely within the fixed portion 153 or entirely within the rotatable portion 158. In addition, the actuator 130 may be configured at the maximum thickness $t_{MAX}$ of the cross-sectional shape 154 of the surface feature 150. By providing a surface feature 150 that can completely accommodate the actuator 130 therein, the surface feature 150 can be easily added onto the outer surface 122 of the rotor blade assembly 100 without disturbing the aerodynamic function of the blade. Alternatively, a portion of the actuator 130 may be configured within the internal volume 160 of the surface feature 150 and a portion of the actuator may be configured outside of the surface feature 150, e.g. on top of the body shell 108 or within the body shell 108.

The actuator 130 may be configured to move at least a portion of the surface feature 150 in a rotational direction 132 (e.g. between the various positions described herein). In additional embodiments, the actuator 130 can be additionally or alternatively configured to move and/or rotate the surface feature 150 in an angular direction that changes the angle of the surface feature 150 with respect to the rotor blade (e.g., similar to a full flap and no flap orientation for an airplane wing). Such embodiments can alter the angle of airflow as it passes over the surface feature 150 (e.g., when it is in the spoiler position). It should be appreciated that the actuator 130 may generally include any suitable device or devices capable of moving and/or rotating the surface feature 150 relative to the body shell 108.

For example, as shown in the illustrated embodiments, the actuator 130 generally includes a motor 134 and a rod 136. More specifically, as shown, the motor 134 may be generally configured within cavity 140 of the fixed portion 156 of the surface feature 150, whereas the rod 136 may be generally configured within the cavity 138 of the rotatable portion 158. As such, the motor 134 may be configured to drive and/or rotate the rod 134 such that rotation of the rod 134 rotates the rotatable portion 158. In still further embodiments, the actuator 130 may include any other suitable device, such as any hydraulic and/or pneumatic device, a rack and pinion, a worm gear driven device, a cam-actuated device, an electromagnetic solenoid or motor, other electro-magnetically actuated devices, a piezo-electric device, a scotch yoke mechanism and/or any other suitable device configured to move and/or rotate the surface features 150.

Referring to FIG. 8, the aerodynamic surface features 150 may extend any suitable height H from the outer surface 122 of the body shell 108. For example, in several embodiments of the present subject matter, the height H may range from about 0.05% to about 1.5% of the corresponding chord 120 defined at the specific span-wise location of the surface feature 150, such as from about 0.1% to about 0.3% of the corresponding chord 120 or from about 0.5% to about 1.2% of the corresponding chord 120 and all other subranges therebetween. Thus, in such embodiments, the ranges of the heights H may generally increase as the surface feature 150 is positioned closer to the blade root 104 and may generally decrease as the surface feature 150 is positioned closer to the blade tip 106. In further embodiments, it should be appreciated that the height H may be less than 0.05% of the corresponding chord 120 defined at the specific span-wise location of the surface feature 150 or may be greater than 1.5% of the corresponding chord 120. More specifically, where the surface features 150 are more proximate to the blade root 104 (i.e. the inboard region), the height H may range from about 20 millimeters (mm) to about 100 mm. In still further embodiments, the height H of the surface features 150 in the inboard region may be less than 20 mm or more than 100 mm. Where the surface features 150 are more proximate to the blade tip 106 (i.e. the outboard region), the height H may range from about 10 mm to about 50 mm. In still further embodiments, the height H of the surface features 150 in the outboard region may be less than 10 mm or more than 50 mm.

Referring to FIG. 9, each of the aerodynamic surface features 150 may include any suitable length L that allows the surface feature 150 to function as described herein. In some embodiments, each of the surface features 150 may have the same length. In further embodiments, some of the surface features 150 (such as those more proximate the blade tip 106 and/or the leading edge 114) may have different lengths (e.g., shorter lengths) than the rest of the surface features 150 (such as those more proximate the blade root 104 and/or the trailing edge 116).

The aerodynamic surface features 150 as described herein may be constructed of any suitable material or materials known in the art for manipulating airflow over the outer surface 122 of the body shell 108. For example, in some embodiments, the aerodynamic surface features 150 and the body shell 108 may be constructed of the same material (e.g., carbon fiber reinforced laminate, glass fiber reinforced laminate composite, etc.). In further embodiments, the surface features 150 may be constructed of different materials than the body shell 108. In still additional embodiments, some of the surface features 150 may be constructed of different material than other surface features 150.

The aerodynamic surface features 150 may also be disposed and distributed in a variety of locations with respect to the body shell 108 of the rotor blade assembly 100. For example, in some embodiments, the surface features 150 may be disposed on the suction side surface 112 of the rotor blade. In further embodiments, the surface features 150 may be disposed on the pressure side surface 110 of the rotor blade assembly 100. In still additional embodiments, the surface features 150 may be disposed on both the suction side surface 112 and the pressure side surface 110 of the rotor blade assembly 100. As such, it should be appreciated that surface features 150 can be disposed adjacent the suction and/or pressure sides 110, 112 of rotor blade assembly 100 to dynamically manage air flow loads based on external conditions (e.g., wind speed, power generation goals, etc.) and operational constraints (e.g., clearance requirements, rotational speed limitations, etc.). In addition, the position of the surface features 150 may be determined as a function of blade design and/or the goal of the flow load management of the rotor blade assembly 100.

Moreover, the aerodynamic surface features 150 may be disposed and spaced in many variations between the blade root 104 and the blade tip 106. For example, the surface features 150 may be spaced apart in the span-wise direction, the chord-wise direction, or both. It should be appreciated that the "span-wise direction" refers to the direction extending parallel to the span 118 of the rotor blade, whereas the "chord-wise direction" refers to the direction extending parallel to the chord 120 of the rotor blade. In some embodiments, the surface features 150 may be evenly spaced apart. In other embodiments, the surface features 150 may be spaced further apart towards either the blade root 104 or the blade tip 106 of the rotor blade assembly 100 or the leading edge 114 or the trailing edge 116 of the rotor blade assembly 100.

Further, the aerodynamic surface features 150 can be attached to the suction and/or pressure sides 110, 112 of the rotor blade assembly 100 using any suitable means. For example, the surface features 150 may be attached using an adhesive, e.g. glue and/or tape. Such an attachment method prevents any penetrations into the body shell 108. Alternatively, however, the surface features 150 may be attached to the body shell 108 using any suitable fasteners, e.g. bolts, screws, etc. Still further embodiments may include molded-in inserts within the body shell 108 for securing the surface features 150 onto one of the surfaces 110, 112 of the rotor blade assembly 100. It should also be understood that any other suitable attachment means known in the art may be utilized to secure the surface features 150 to the surfaces 110, 112.

Further, it should be appreciated that the actuator(s) 130 of the disclosed rotor blade assembly 100 may be controlled individually or in groups. For example, it may be desirable to actuate only a portion of the surface features 150 or all of the surface features 150 depending on the amount of lift and/or drag generated by the blade assembly 100. Similarly, it may be desirable to actuate a portion of the surface features 150 or all of the surface features 150 depending upon on the loading on the wind turbine 10 and/or its various components. It should also be appreciated that any suitable means may be utilized to control the actuator(s) 130. For example, the actuator(s) 130 may be communicatively coupled to the turbine controller (not shown) of the wind turbine 10 or any other suitable control device (e.g. a computer and/or any other suitable processing equipment) configured to control the operation of the actuator(s) 130.

Additionally, in several embodiments of the present subject matter, the disclosed rotor blade assembly 100 may include any suitable means for determining various operating conditions of the rotor blades 16 and/or the wind turbine 10 (FIG. 1). Thus, in one embodiment, one or more sensors (not shown), such as load sensors, position sensors, speed sensors, strain sensors and the like, may be disposed at any suitable location along the rotor blade assembly 100 (e.g., at or adjacent to the blade root 104 (FIG. 2)), with each sensor being configured to measure and/or determine one or more operating conditions of the rotor blades 16. For example, the sensors may be configured to measure the wind speed, the loading occurring at the blade root 104, the deformation of the blade root 104, the rotational speed of the rotor blade 16 and/or any other suitable operating conditions. The disclosed surface features 150 may then be rotated based upon the measured/determined operating conditions to optimize the performance of the rotor blade 16. For instance, the sensors may be communicatively coupled to the same controller and/or control device as the actuator(s) 130 such that the surface features 150 may be rotated automatically based on the output from the sensors. Thus, in one embodiment, if the output from the sensors indicates that the wind speeds, root loading and/or root deformation is/are significantly high, the disclosed surface features 150 may be rotated to the vortex generator position in order to separate the airflow from the rotor blade 16 and reduce the loading and/or deformation on the blade root 104. Similarly, if the sensors indicate that flow separation is occurring or is likely to occur, the disclosed surface features 150 may be rotated to an appropriate position in order to prevent flow separation and enhance the performance of the rotor blade 16. However, it should be appreciated that, in alternative embodiments, the disclosed surface features 150 need not be controlled based on output(s) from a sensor(s). For example, the surfaces features 150 may be rotated based on predetermined operating conditions and/or predetermined triggers programmed into the control logic of the turbine controller or other suitable control device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:

a body shell comprising a pressure side surface and a suction side surface extending between a leading edge and a trailing edge;

at least one aerodynamic surface feature disposed adjacent to at least one of the pressure side surface or the suction side surface, the surface feature defining an internal volume; and, an actuator completely enclosed within the internal volume, the actuator configured to rotate the surface feature relative to the body shell.

2. The rotor blade assembly of claim 1, wherein the surface feature comprises a fixed portion and a rotatable portion, the fixed portion being fixed relative to the body shell, the rotatable portion rotatable relative to the fixed portion.

3. The rotor blade assembly of claim 2, wherein the fixed portion comprises a bottom surface and a top surface, the bottom surface attached to at least one of the pressure side surface or the suction side surface of the rotor blade, the top surface of the fixed portion adjacent to the rotatable portion.

4. The rotor blade assembly of claim 3, wherein, when in a rotated configuration, the surface feature defines a gap between the rotatable portion and the body shell.

5. The rotor blade assembly of claim 3, wherein the actuator is atop the bottom surface of the fixed portion within the internal volume, wherein the actuator is positioned partially within the fixed portion and partially within the rotatable portion.

6. The rotor blade assembly of claim 1, wherein the surface feature comprises an airfoil-shaped cross-section.

7. The rotor blade assembly of claim 6, wherein the airfoil-shaped cross-section comprises varying thicknesses along a length of the surface feature, the actuator located at a maximum thickness of the airfoil-shaped cross-section.

8. The rotor blade assembly of claim 1, further comprising a plurality of aerodynamic surface features, each of the surface features comprising an actuator positioned at least partially within the internal volume of each of the surface features.

9. The rotor blade assembly of claim 8, wherein a first set of the plurality of surface features is more proximate a blade root than a second set of the plurality of surface features, and wherein the second set of the plurality of surface features is more proximate to a blade tip than the first set of the plurality of surface features.

10. The rotor blade assembly of claim 1, wherein the surface feature is configured to rotate between any of the following positions: a vortex generator position, a spoiler position, a gurney flap position, or a stall breaker position.

11. The rotor blade assembly of claim 1, wherein a height is defined between a tip end of each of the surface features and an outer surface of said body shell when the surface feature is installed onto at least one of the pressure side surface or the suction side surface of the body shell, said height ranging from about 10 millimeters to about 100 millimeters.

12. An aerodynamic surface feature for a rotor blade of a wind turbine, the surface feature comprising:

a body defining a profile of the surface feature, the body comprising:

a fixed portion comprising a bottom surface, a top surface, and an internal volume, the bottom surface attachable to at least one of a pressure side surface or a suction side surface of the rotor blade, the internal volume configured to house at least a portion of an actuator therein, and a rotatable portion positioned atop the top surface of the fixed portion, the rotatable portion rotatable relative to the fixed portion when the surface feature is attached to a surface of the rotor blade; and an actuator completely enclosed within the internal volume, the actuator being configured to rotate the rotatable portion relative to a body shell of the rotor blade.

13. The surface feature of claim 12, wherein the surface feature comprises an airfoil-shaped cross-section, the airfoil-shaped cross-section comprising varying thicknesses along a length of the surface feature, wherein the actuator is positioned at a maximum thickness of the airfoil-shaped cross-section.

14. The surface feature of claim 12, wherein the surface feature is configured to rotate between any of the following positions: a vortex generator position, a spoiler position, a gurney flap position, or a stall breaker position.

15. A rotor blade assembly for a wind turbine, the rotor blade assembly comprising:
a body shell comprising a pressure side surface and a suction side surface extending between a leading edge and a trailing edge; and,
at least one aerodynamic surface feature disposed adjacent to at least one of the pressure side surface or the suction side surface, the surface feature comprising a fixed portion and a rotatable portion, the fixed portion comprising a top surface, a bottom surface, and side walls that define a hollow internal volume, the bottom surface attached to at least one of the pressure side surface or the suction side surface of the rotor blade, the rotatable portion positioned atop the top surface of the fixed portion and rotatable relative to the fixed portion, the fixed portion and the rotatable portion each separately defining an airfoil-shaped cross-section, the airfoil-shaped cross-section of the fixed portion substantially matching the airfoil-shaped cross-section of the rotatable portion, wherein the rotatable portion of the surface feature rotates relative to the body shell.

16. The rotor blade assembly of claim 15, further comprising an actuator completely enclosed within the internal volume, the actuator being configured to rotate the rotatable portion of the surface feature relative to the body shell.

17. The rotor blade assembly of claim 16, wherein the airfoil-shaped cross-sections comprise varying thicknesses along a length of the surface feature, and wherein the actuator is positioned at a maximum thickness of the airfoil-shaped cross-sections.

18. The rotor blade assembly of claim 15, wherein, when in a rotated configuration, the surface feature defines a gap between the rotatable portion and the body shell.

* * * * *